(12) United States Patent
Meyer et al.

(10) Patent No.: US 8,441,026 B2
(45) Date of Patent: May 14, 2013

(54) RED EMITTING SIALON-BASED MATERIAL

(75) Inventors: Joerg Meyer, Aachen (DE); Peter J. Schmidt, Aachen (DE); Hans-Helmut Bechtel, Roetgen (DE); Walter Mayr, Alsdorf (DE); Baby-Seriyati Schreinemacher, Eynatten (BE); Matthias Heidemann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 12/747,544

(22) PCT Filed: Dec. 15, 2008

(86) PCT No.: PCT/IB2008/055285
§ 371 (c)(1),
(2), (4) Date: Aug. 31, 2010

(87) PCT Pub. No.: WO2009/081320
PCT Pub. Date: Jul. 2, 2009

(65) Prior Publication Data
US 2010/0320492 A1 Dec. 23, 2010

(30) Foreign Application Priority Data
Dec. 19, 2007 (EP) .................................. 07123546

(51) Int. Cl.
*H01L 33/00* (2010.01)

(52) U.S. Cl.
USPC ...................................... 257/98; 257/E33.061

(58) Field of Classification Search .................... 257/98, 257/E33.061, E33.67; 252/301.4 F, 301.4 R; 349/71; 313/503
See application file for complete search history.

(56) References Cited

U.S. PATENT DOCUMENTS

| 2002/0043925 | A1 | 4/2002 | Sun et al. | |
|---|---|---|---|---|
| 2005/0230689 | A1 | 10/2005 | Setlur et al. | |
| 2007/0103057 | A1 | 5/2007 | Sohn et al. | |
| 2008/0265749 | A1* | 10/2008 | Bechtel et al. | 313/503 |
| 2008/0290785 | A1* | 11/2008 | Schmidt et al. | 313/501 |
| 2010/0208449 | A1* | 8/2010 | Schmidt et al. | 362/84 |
| 2010/0224896 | A1* | 9/2010 | Schmidt et al. | 257/98 |

FOREIGN PATENT DOCUMENTS

| EP | 1433831 A1 | 6/2004 |
|---|---|---|
| EP | 1696016 A1 | 8/2006 |
| JP | 2006314109 A | 11/2006 |
| WO | 2005049763 A1 | 6/2005 |
| WO | 2006117984 A1 | 11/2006 |
| WO | 2007037059 A1 | 4/2007 |

* cited by examiner

Primary Examiner — Vongsavanh Sengdara

(57) ABSTRACT

The invention relates to a red emitting material of the composition $a(M^{II}N_{2/3})*b(M^{III}N)*c(M^{IV}N_{4/3})*d_1CeO_{3/2}*d_2EuO*xM^{IV}O_2*yM^{III}O_{3/2}$ with Cerium and Europium present in the material. This material has been found to have an increased lumen equivalent and absorption efficiency of blue light.

10 Claims, 1 Drawing Sheet

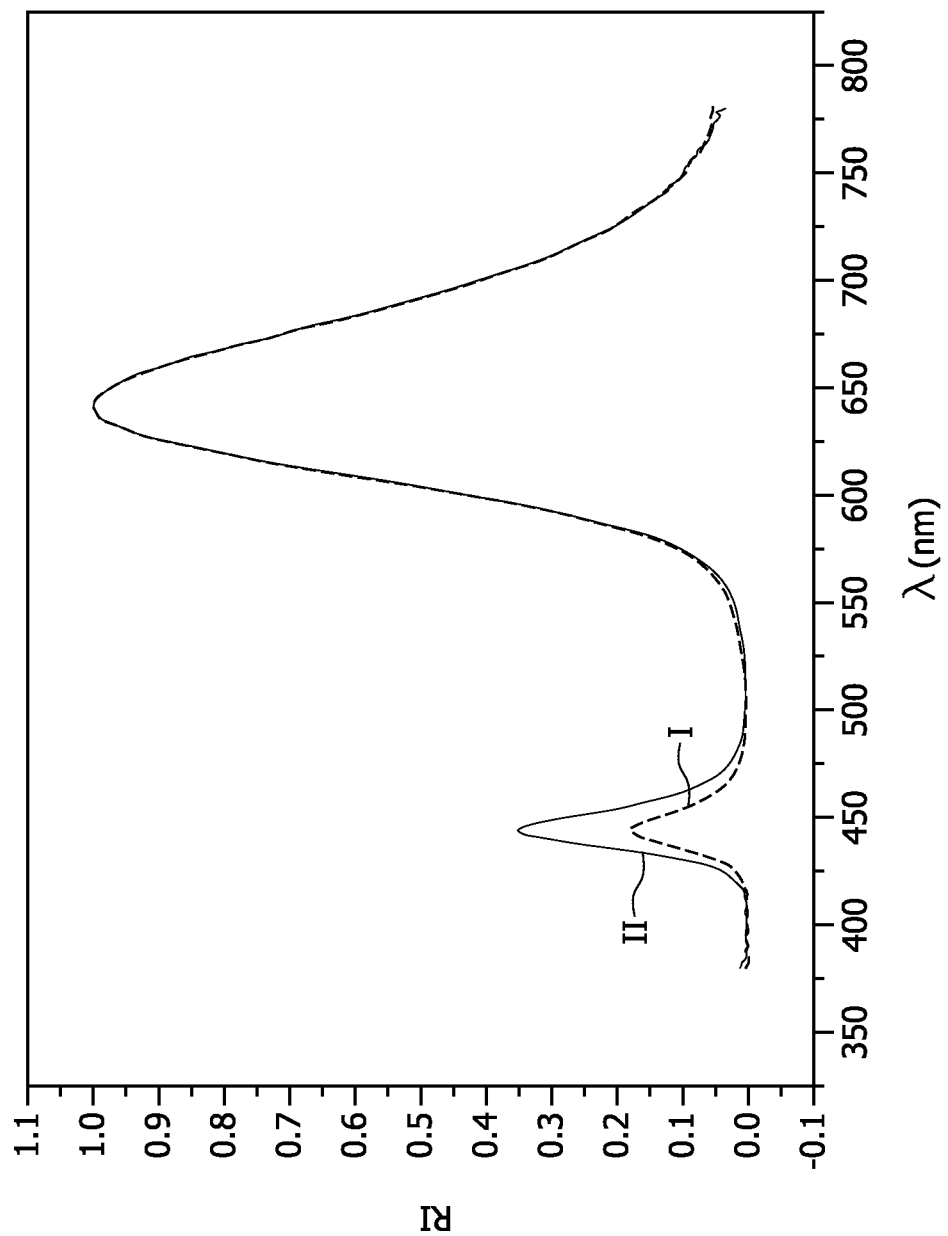

RED EMITTING SIALON-BASED MATERIAL

FIELD OF THE INVENTION

The present invention is directed to materials, especially materials for light emitting devices.

BACKGROUND OF THE INVENTION

Phosphors comprising silicates, phosphates (for example, apatite) and aluminates as host materials, with transition metals or rare earth metals added as activating materials to the host materials, are widely known. As blue LEDs, in particular, have become practical in recent years, the development of white light sources utilizing such blue LEDs in combination with such phosphor materials is being energetically pursued.

Especially luminescent materials based on the so-called "SiAlON"-system have found the focus of attention in the field due to their good optical features.

However, there is still the continuing need for luminescent materials which are usable within a wide range of applications and especially allow the fabrication of phosphor warm white pcLEDs with optimized luminous efficiency and color rendering.

Especially in the field of red emitting phosphors, several materials have been the subject of investigation.

E.g. in the EP1696016A1 the material $CaAlSiN_3:Eu$ is described as a new red phosphor powder. The material shows a highly saturated red emission, however this implies a low lumen equivalent of the emission spectrum and therefore a low lumen output of light sources which use this phosphor. For general lighting applications higher lumen equivalents are favourable due to the higher efficiencies they enable.

SUMMARY OF THE INVENTION

It is an object of the present invention to provide a material which has improved optical features together with a good producibility and stability This object is solved by a material according to claim 1 of the present invention. Accordingly, a red emitting material is provided essentially having a main phase of the composition $$a(M^{II}N_{2/3})*b(M^{III}N)*c(M^{IV}N_{4/3})*d_1CeO_{3/2}*d_2EuO*xM^{IV}O_2*yM^{III}O_{3/2}$$

wherein $M^{II}$ is an alkaline earth metal chosen of the group of Ca, Mg, Sr and Ba or mixtures thereof, $M^{IV}$ is selected out of the group comprising Si, Ge, C, Zr, Hf or mixtures thereof, and $M^{III}$ is selected out of the group comprising Al, B, Sc, Ga, and Lu or mixtures thereof,
with $$0.95*c \leq a+d_1+d_2 \leq 1.2*b \text{ and } a+d_1+d_2 \geq c+x,$$

$$(b+y):(c+x) \geq 1,$$

$$(b+y) \leq 1+10*d_1,$$

$$b \geq 5*y,$$

$$c \geq 10*x,$$

$$d_1 > 0$$

$$d_2 \geq 0.001$$

The term "red emitting" especially means and/or includes that the material shows an emission in the visible range (upon suitable excitation) with a maximum between 590 and 670 nm.

The term "essentially" means especially that $\geq 90\%$, preferably $\geq 95\%$ and most preferred $\geq 99\%$ of the material has the desired structure and/or composition.

The term "main phase" implies that there may be further phases, e.g. resulting out of mixture(s) of the above-mentioned materials with additives which may be added e.g. during ceramic processing. These additives may be incorporated fully or in part into the final material, which then may also be a composite of several chemically different species (main phase crystallites embedded into a glassy matrix of slightly different composition, generally more rich in oxygen content) and particularly include such species known to the art as fluxes. Suitable fluxes include alkaline earth- or alkaline-metal oxides and fluorides, $SiO_2$, SiONes and the like.

Such a material has shown for a wide range of applications within the present invention to have at least one of the following advantages:

The stability of the material is usually improved comprising to materials of the prior art. The material has usually a very high thermal, especially photothermal stability.

The lumen equivalent is greatly increased compared with the materials of the prior art (for comparable blue to red conversion ratios)

The conversion efficiency of blue light e.g. by a pump LED is also greatly increased (for comparable color points).

Without being bound to any theory, the inventors believe that the surprising effects which may be found in many applications of the present invention arise at least partially that blue light e.g. emitted by the pump LED is not only absorbed by red emitting Eu(II), but also by Ce(III). However, in a second step radiation energy absorbed by Ce(III) is efficiently transferred to Eu(II) either by reabsorption of the yellow Ce(III) emission or directly by quantum mechanical energy transfer.

Therefore, the use of a material as described in the present invention allows for many applications efficient absorption of the blue LED light with only low Eu(II) concentrations in the ceramic which leads to an enhancement of the lumen output.

According to a preferred embodiment of the present invention, $d_2$ follows $d_2*0.1 \leq d_1 \leq d_2*10$. This further increases the efficiency of the material for many applications within the present invention. More preferred $d_2$ follows $d_2*0.3 \leq d_1 \leq d_2*3$ and most preferred $d_2*0.7 \leq d_1 \leq d_2*1$.

According to a preferred embodiment of the present invention, $d_1$ follows $0.001 \leq d_1 \leq 0.01$. This has shown to be advantageous for many applications within the present invention.

According to a preferred embodiment of the present invention, $d_2$ follows $0.001 \leq d_2 \leq 0.005$. This has shown to be advantageous for many applications within the present invention.

According to a preferred embodiment of the present invention, the lumen equivalent LE is $\geq 100$ lm/W, preferably $\geq 120$ lm/W.

The lumen equivalent, also called the luminous efficacy of radiation, is the theoretical maximum ratio of luminous flux to radiant power, which a light source with a given spectral distribution can achieve with a 100% radiant efficiency.

It should be noted that in the context of the present invention, the charge compensation for Ce(III) compared to Eu(II) is realised by adjusting the Al/Si ratio. Replacing Al(III) for Si(IV) will result in a net negative charge—given the anion lattice remains unaltered—which may accommodate Ce(III) on Ca(II) sites.

This type of charge compensation is advantageous for many applications within the present invention as changes of the Al/Si ratio affect the lattice only minimally due to the similarity of the two ions; also the introduction of additional ions is avoided leading to a better phase pureness and stability of the materials.

The present invention furthermore relates to a red emitting material essentially having a main phase of the composition $$a(CaN_{2/3})*b(AlN)*c(SiN_{4/3})*d_1CeO_{3/2}*d_2EuO*xSiO_2*yAlO_{3/2}$$

with $$0.95*c \leq a+d_1+d_2 \leq 1.2*b \text{ and } a+d_1+d_2 c+x,$$

$$(b+y):(c+x) \geq 1,$$

$$(b+y) \leq 1+10*d_1,$$

$$b \geq 5*y,$$

$$c \geq 10*x,$$

$$0.001 \leq d_1 \leq 0.01$$

$$0.001 \leq d_2 \leq 0.005$$

$$d_1 \leq d_2$$

$$0.01*d_2 \leq d_1 \leq 10*d_2$$

$$0 \leq (d_1+d_2+x+y) \leq 0.4$$

This has been shown to especially increase the optical features of the material.

The present invention furthermore relates to a ceramic material comprising a red emitting material according to the present invention, which essentially having a main phase of the composition $$a(M^{II}N_{2/3})*b(M^{III}N)*c(M^{IV}N_{4/3})*d_1CeO_{3/2}*d_2EuO*xM^{IV}O_2*yM^{III}O_{3/2}$$

wherein $M^{II}$ is an alkaline earth metal chosen of the group of Ca, Mg, Sr and Ba or mixtures thereof, $M^{IV}$ is selected out of the group comprising Si, Ge, C, Zr, Hf or mixtures thereof, and $M^{III}$ is selected out of the group comprising Al, B, Sc, Ga, and Lu or mixtures thereof,
with $$0.95*c \leq a+d_1+d_2 \leq 1.2*b \text{ and } a+d_1+d_2 \geq c+x,$$

$$(b+y):(c+x) \geq 1,$$

$$(b+y) \leq 1+10*d_1,$$

$$b \geq 5*y,$$

$$c \geq 10*x,$$

$$d_1 > 0$$

$$d_2 \geq 0.001$$

The term "ceramic material" in the sense of the present invention means and/or includes especially a crystalline or polycrystalline compact material or composite material with a controlled amount of pores or which is pore free.

The term "polycrystalline material" in the sense of the present invention means and/or includes especially a material with a volume density larger than 90 percent of the main constituent, consisting of more than 80 percent of single crystal domains, with each domain being larger than 0.5 μm in diameter and may have different crystallographic orientations. The single crystal domains may be connected by amorphous or glassy material or by additional crystalline constituents.

Such a ceramic material has shown for a wide range of applications within the present invention to have at least one of the following advantages:

The stability of the material is usually improved comprising to materials of the prior art. The material has usually a very high thermal, especially photothermal stability.

The lumen equivalent is greatly increased compared with the materials of the prior art (for comparable blue to red conversion ratios)

The conversion efficiency of blue light e.g. by a pump LED is also greatly increased (for comparable color points).

Without being bound to any theory, the inventors believe that the surprising effects which may be found in many applications of the present invention arise at least partially that blue light e.g. emitted by the pump LED is not only absorbed by red emitting Eu(II), but also by Ce(III). However, in a second step radiation energy absorbed by Ce(III) is efficiently transferred to Eu(II) either by reabsorption of the yellow Ce(III) emission or directly by quantum mechanical energy transfer.

Therefore, the use of a ceramic material as described in the present invention allows for many applications efficient absorption of the blue LED light with only low Eu(II) concentrations in the ceramic which leads to an enhancement of the lumen output.

According to a preferred embodiment of the present invention, $d_2$ follows $d_2*0.1 \leq d_1 \leq d_2*10$. This further increases the efficiency of the ceramic material for many applications within the present invention. More preferred d2 follows $d_2*0.3 \leq d_1 \leq d_2*3$ and most preferred $d_2*0.7 \leq d_1 \leq d_2*1$.

According to a preferred embodiment of the present invention, $d_1$ follows $0.001 \leq d_1 \leq 0.01$. This has shown to be advantageous for many applications within the present invention.

According to a preferred embodiment of the present invention, $d_2$ follows $0.001 \leq d_2 \leq 0.005$. This has shown to be advantageous for many applications within the present invention.

According to a preferred embodiment of the present invention, the lumen equivalent LE is $\geq 100$ lm/W, preferably $\geq 120$ lm/W.

The lumen equivalent, also called the luminous efficacy of radiation, is the theoretical maximum ratio of luminous flux to radiant power, which a light source with a given spectral distribution can achieve with a 100% radiant efficiency.

It should be noted that in the context of the present invention, the charge compensation for Ce(III) compared to Eu(II) is realised by adjusting the Al/Si ratio. Replacing Al(III) for Si(IV) will result in a net negative charge—given the anion lattice remains unaltered—which may accommodate Ce(III) on Ca(II) sites.

This type of charge compensation is advantageous for many applications within the present invention as changes of the Al/Si ratio affect the lattice only minimally due to the similarity of the two ions; also the introduction of additional ions is avoided leading to a better phase pureness and stability of the materials.

The present invention furthermore relates to a ceramic material comprising a red emitting material according to the present invention, which essentially having a main phase of the composition

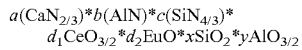
$a(CaN_{2/3})*b(AlN)*c(SiN_{4/3})*$
$d_1CeO_{3/2}*d_2EuO*xSiO_2*yAlO_{3/2}$ with $0.95*c \leq a+d_1+d_2 \leq 1.2*b$ and $a+d_1+d_2 \geq c+x$, $(b+y):(c+x) \geq 1$, $(b+y) \leq 1+10*d_1$, $b \geq 5*y$, $c \geq 10*x$, $0.001 \leq d_1 \leq 0.01$ $0.001 \leq d_2 \leq 0.005$ $d_1 \leq d_2$ $0.01*d_2 \leq d_1 \leq 10*d_2$ $0 \leq (d_1+d_2+x+y) \leq 0.4$ According to a preferred embodiment of the present invention, the photothermal stability of the ceramic material is ≧80% to ≦100% after exposure of the ceramic material for 1000 hrs at 200° C. with a light power density of 10 W/cm² and an average photon energy of 2.75 eV.

The term "photothermal stability" in the sense of the present invention especially means and/or includes the conservation of the luminescence intensity under simultaneous application of heat and high intensity excitation, i.e. a photothermal stability of 100% indicates that the material is virtually unaffected by the simultaneous irradiation and heat up.

According to a preferred embodiment of the present invention, the photothermal stability of the ceramic material is ≧82.5% to ≦95%, preferably ≧85% to ≦97%, after exposure of the ceramic material for 1000 hrs at 200° C. with a light power density of 10 W/cm² and an average photon energy of 2.75 eV.

According to a preferred embodiment of the present invention, the thermal conductivity of the ceramic material at room temperature is ≧2 W m⁻¹K⁻¹ to ≦70 W m⁻¹K⁻¹

According to one embodiment of the present invention, the ceramic material shows a transparency for normal incidence in air of ≧10% to ≦85% for light in the wavelength range from ≧650 nm to ≦1000 nm.

Preferably, the transparency for normal incidence is in air of ≧20% to ≦80% for light in the wavelength range from ≧650 nm to ≦1000 nm, more preferred ≧30% to ≦75% and most preferred >40% to <70% for a light in the wavelength range from ≧650 nm to ≦1000 nm.

The term "transparency" in the sense of the present invention means especially that ≧10% preferably ≧20%, more preferred ≧30%, most preferred ≧40% and ≦85% of the incident light of a wavelength, which cannot be absorbed by the material, is transmitted through the sample for normal incidence in air (at an arbitrary angle). This wavelength is preferably in the range of ≧650 nm and ≦1000 nm.

According to a preferred embodiment of the present invention, the ceramic material has a density of ≧3 g/cm³, preferably ≧3.1 g/cm³.

According to a preferred embodiment of the present invention, the ceramic material has a density of ≧95% and ≦101% of the theoretical density.

According to a preferred embodiment of the present invention, the ceramic material has a density of ≧97% and ≦100% of the theoretical density.

The densities lower than 100% according to the described preferred embodiment of the present invention are preferably obtained by sintering of the ceramic to a stage where still pores are present in the ceramic matrix. Most preferred are densities in the range ≧98.0% and ≦99.8% with total pore volumes in the ceramic matrix within the ≧0.2-≦2% range. A preferred mean pore diameter is in the ≧400-≦1500 nm range.

The present invention furthermore relates to a method of producing a material for a light emitting device according to the present invention comprising a sintering step.

The term "sintering step" in the sense of the present invention means especially densification of a precursor powder under the influence of heat, which may be combined with the application of uniaxial or isostatic pressure, without reaching the liquid state of the main constituents of the sintered material.

According to an embodiment of the present invention, the sintering step is pressureless, preferably in reducing or inert atmosphere.

According to an embodiment of the present invention, the method furthermore comprises the step of pressing the precursor material(s) to ≧50% to ≦70%, according to an embodiment of the present invention, ≧55% to ≦60% of its theoretical density before sintering. It has been shown in practice that this improves the sintering steps for most materials as described with the present invention.

According to an embodiment of the present invention, the method of producing a material for a light emitting device according to the present invention comprises the following steps:

(a) Mixing the precursor materials for the material (b) optional firing of the precursor materials, preferably at a temperature of ≧1300° C. to ≦1800° C. to remove volatile materials (c) optional grinding and washing (d) a first pressing step, preferably a uniaxial pressing step at ≧10 kN using a suitable powder compacting tool with a mould in the desired shape (e.g. rod- or pellet-shape) and/or a cold isostatic pressing step preferably at ≧3000 bar to ≦3500 bar.

(e) a pressureless sintering step at ≧1500° C. to ≦2200° C.

(f) a hot pressing step, preferably a hot isostatic pressing step preferably at ≧100 bar to ≦2500 bar and preferably at a temperature of ≧1500° C. to ≦2000° C. and/or a hot uniaxial pressing step preferably at ≧100 bar to ≦2500 bar and preferably at a temperature of ≧1500° C. to ≦2000° C.

(g) optionally a post annealing step at >1000° C. to <1700° C. in inert or reducing atmosphere.

The present invention furthermore relates to a light emitting device comprising a ceramic material further comprising a red emitting material according to the present invention.

A light emitting device according to the present invention as well as a material and/or ceramic material according to the present invention and/or a material as produced with the present method may be of use in a broad variety of systems and/or applications, amongst them one or more of the following:

- Office lighting systems
- household application systems
- shop lighting systems,
- home lighting systems,
- accent lighting systems,
- spot lighting systems,
- theater lighting systems,
- fiber-optics application systems,
- projection systems,
- self-lit display systems,
- pixelated display systems,
- segmented display systems,
- warning sign systems,
- medical lighting application systems,
- indicator sign systems, and
- decorative lighting systems
- portable systems
- automotive applications
- green house lighting systems The aforementioned components, as well as the claimed components and the components to be used in accordance with the invention in the described embodiments, are not subject to any special exceptions with respect to their size, shape, material selection and technical concept such that the selection criteria known in the pertinent field can be applied without limitations.

BRIEF DESCRIPTION OF THE DRAWINGS

Additional details, features, characteristics and advantages of the object of the invention are disclosed in the subclaims, the figures and the following description of the respective FIGURE and examples, which—in an exemplary fashion—show one embodiment and example of a material according to the invention.

FIG. 1: shows the relative intensity (RI) as a function of the wavelength $\lambda$(nm) for one inventive Example (I) and a comparative Example (II)

EXAMPLE I

The invention will be better understood together with the Example I which—in a mere illustrative fashion—is one Example of an inventive red emitting material.

Example I refers to a material with the nominal composition

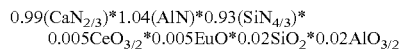

which was prepared in form of ceramic platelets in the following fashion:

All actions were carried out in dry inert gas atmosphere. 4.991 g $Ca_3N_2$ (2N), 4.304 g AlN (3N) containing 0.082% w/w O, 4.496 g $Si_3N_4$ containing 1.26% w/w O, 0.086 g $CeO_2$ (4N) and 0.088 g $Eu_2O_3$ (4N) were intimately mixed e.g. by planetary ball milling using a suitable dispersing liquid like tetrahydrofuran. The liquid was removed by evaporation and the mixture was subsequently fired in forming gas atmosphere ($N_2$:$H_2$ 95:5 v/v) at 1500° C. for 4 hours. The obtained powder was deagglomerated on a roller bench for 1 h. After removing of solvent and grinding media, the powder was sieved through a 20 μm sieve, dispersed in a solvent and a binder was added. The solvent was removed using a rotary evaporator, the powder granulated using a 300 μm sieve, dried at 110° C. and finally rolled again on a roller bench for 15 minutes. The obtained granulate was pressed into pellets by uniaxial pressing at 5 kN and subsequent cold isostatic pressing at 3600 bar. The pellets were sintered at 1650° C. for 10 h in forming gas atmosphere, optionally this is followed by hot isostatic pressing at 1 kbar $N_2$ and 1650° C. for 4 h. After sintering the ceramic wafer was ground to 100 μm thickness and diced to platelets of 1.1×1.1 mm².

FIG. 1 shows a diagram of the relative emitted radiant flux (RI) vs. the wavelength $\lambda$ of the inventive Example I (dotted line) and a comparative Example II (straight line).

The composition of the comparative Example II differs in that from the inventive Example I in that no cerium was used. The two spectra in FIG. 1 were measured from ceramic platelets (made as above) with the same thickness and the same density glued with silicone to a blue LED and are normalized towards each other to the red emission peak. Radiant flux below 500 nm in FIG. 1 results from LED light transmitted by the ceramic platelets.

From FIG. 1 it can be clearly seen that the absorption of blue light (e.g. from a pump LED) at 450 nm is surprisingly much higher. This leads to a greatly increased efficiency of red emission at a high lumen equivalent. In this way the lumen output of the LED lamp is increased.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. Red emitting material essentially having a main phase of the composition $$a(M^{II}N_{2/3})*b(M^{III}N)*c(M^{IV}N_{4/3})*\\d_1CeO_{3/2}*d_2EuO*xM^{IV}O_2*yM^{III}O_{3/2}$$

wherein $M^{II}$ is an alkaline earth metal chosen of the group of Ca, Mg, Sr and Ba or mixtures thereof, $M^{IV}$ is selected out of the group comprising Si, Ge, C, Zr, Hf or mixtures thereof, and $M^{III}$ is selected out of the group comprising Al, B, Sc, Ga, and Lu or mixtures thereof, with $0.95*c \leq a+d_1+d_2 \leq 1.2*b$ and $a+d_1+d_2 \geq c+x$, $(b+y):(c+x) \geq 1$, $(b+y) \leq 1+10*d_1$, $b \geq 5*y$, $c \geq 10*x$, $0.001 \leq d_1 \leq 0.01$, $0.001 \leq d_2 \leq 0.005$, $0 \leq (d_1+d_2+x+y) \leq 0.4$.

2. The material of claim 1, whereby $d_2*0.1 \leq d_1 \leq d_2*10$.

3. The material of claim 1, having a lumen equivalent LE of $\geq 100$ lm/W.

4. The material of claim 1, essentially having a main phase of the composition $$a(CaN_{2/3})*b(AlN)*c(SiN_{4/3})*d_1CeO_{3/2}*d_2EuO*xSiO_2*yAlO_{3/2}$$

with $0.95*c \leq a+d_1+d_2 \leq 1.2*b$ and $a+d_1+d_2 \geq c+x$, $(b+y):(c+x) \geq 1$, $(b+y) \leq 1+10*d_1$, $b \geq 5*y$, $c \geq 10*x$, $0.001 \leq d_1 \leq 0.01$ $0.001 \leq d_2 \leq 0.005$ $d_1 \leq d_2$ $0.01*d_2 \leq d_1 \leq 10*d_2$ $0 \leq (d_1+d_2+x+y) \leq 0.4$.

5. A ceramic material comprising a red emitting material according to claim 1.

6. The ceramic material of claim 5, whereby the photothermal stability of the ceramic material is $\geq 80\%$ to $\leq 100\%$ after exposure of the ceramic material for 1000 hrs at 200° C. with a light power density of 10 W/cm² and an average photon energy of 2.75 eV.

7. The ceramic material of claim 5, whereby the thermal conductivity of the ceramic material at room temperature is $\geq 2$ W cm$^{-1}$K$^{-1}$ to $\leq 70$ W cm$^{-1}$K$^{-1}$.

8. The ceramic material of claim 5, whereby the ceramic material has a density of $\geq 95\%$ and $\leq 101\%$ of the theoretical density.

9. A light emitting device, especially a LED, comprising a ceramic material according to claim 5, which comprises a red emitting material essentially having a main phase of the composition $$a(M^{II}N_{2/3})*b(M^{III}N)*c(M^{IV}N_{4/3})*d_1CeO_{3/2}*d_2EuO*xM^{IV}O_2*yM^{III}O_{3/2}$$

wherein $M^{II}$ is an alkaline earth metal chosen of the group of Ca, Mg, Sr and Ba or mixtures thereof, $M^{IV}$ is selected out of the group comprising Si, Ge, C, Zr, Hf or mixtures thereof, and $M^{III}$ is selected out of the group comprising Al, B, Sc, Ga, and Lu or mixtures thereof, with $0.95*c \leq a+d_1+d_2 \leq 1.2*b$ and $a+d_1+d_2 \geq c+x$, $(b+y):(c+x) \geq 1$, $(b+y) \leq 1+10*d_1$, $b \geq 5*y$, $c \geq 10*x$, $d_1 > 0$ $d_2 \geq 0.001$.

10. A system comprising a material and/or ceramic material according to claim 1, the system being used in one or more of the following applications: Office lighting systems household application systems shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, and decorative lighting systems portable systems automotive applications green house lighting systems.

* * * * *